(12) United States Patent
Riddle et al.

(10) Patent No.: US 12,287,429 B2
(45) Date of Patent: Apr. 29, 2025

(54) NON-UNIFORM LIDAR BEAM CONFIGURATION FOR OBJECT DETECTION, TRACKING AND CLASSIFICATION

(71) Applicant: Quanergy Solutions, Inc., San Jose, CA (US)

(72) Inventors: Alfred Riddle, Sunnyvale, CA (US); Tianyue Yu, Sunnyvale, CA (US); Jaswant Rai, Sunnyvale, CA (US); Ross Taylor, Sunnyvale, CA (US)

(73) Assignee: Quanergy Solutions, Inc., San Jose, CA (US)

(*) Notice: Subject to any disclaimer, the term of this patent is extended or adjusted under 35 U.S.C. 154(b) by 1046 days.

(21) Appl. No.: 17/211,159

(22) Filed: Mar. 24, 2021

(65) Prior Publication Data

US 2021/0302542 A1   Sep. 30, 2021

Related U.S. Application Data

(60) Provisional application No. 62/994,477, filed on Mar. 25, 2020.

(51) Int. Cl.
*G01S 7/481* (2006.01)

(52) U.S. Cl.
CPC .......... *G01S 7/4813* (2013.01); *G01S 7/4815* (2013.01)

(58) Field of Classification Search
None
See application file for complete search history.

(56) References Cited

U.S. PATENT DOCUMENTS 9,557,585 B1 * 1/2017 Yap .................. H01L 23/5226
2018/0267146 A1 * 9/2018 Ingram ................ G01S 17/10

* cited by examiner

*Primary Examiner* — Luke D Ratcliffe
(74) *Attorney, Agent, or Firm* — Fox Rothschild LLP; Carol E. Thorstad-Forsyth

(57) ABSTRACT

An apparatus has a collection of emitters on an emitter substrate with irregular distances between the collection of emitters to produce optical beams in a far field with a more even distribution than conventional optical beams in the far field produced by a conventional collection of emitters with regular distances between the conventional collection of emitters. A collection of receivers on a receiver substrate has irregular distances between the collection of receivers. A system substrate hosts the emitter substrate and the receiver substrate.

10 Claims, 7 Drawing Sheets

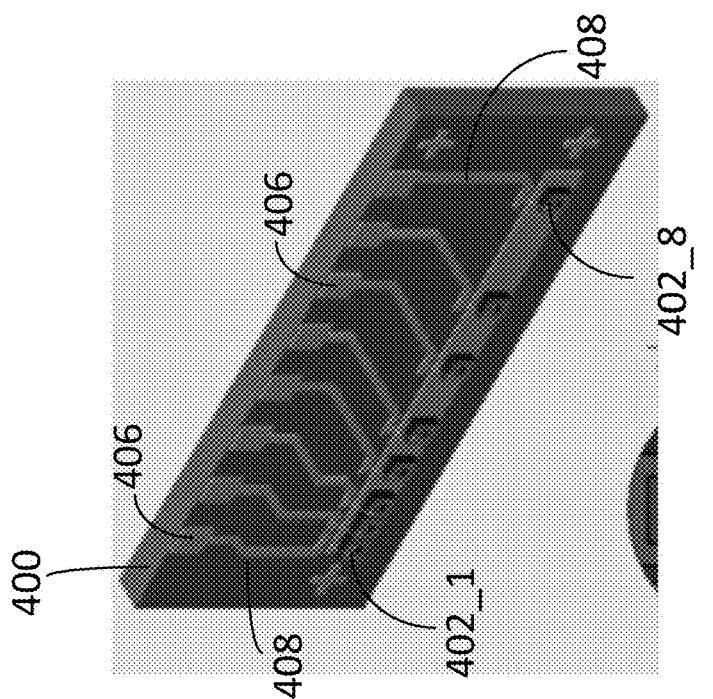
FIG. 4C
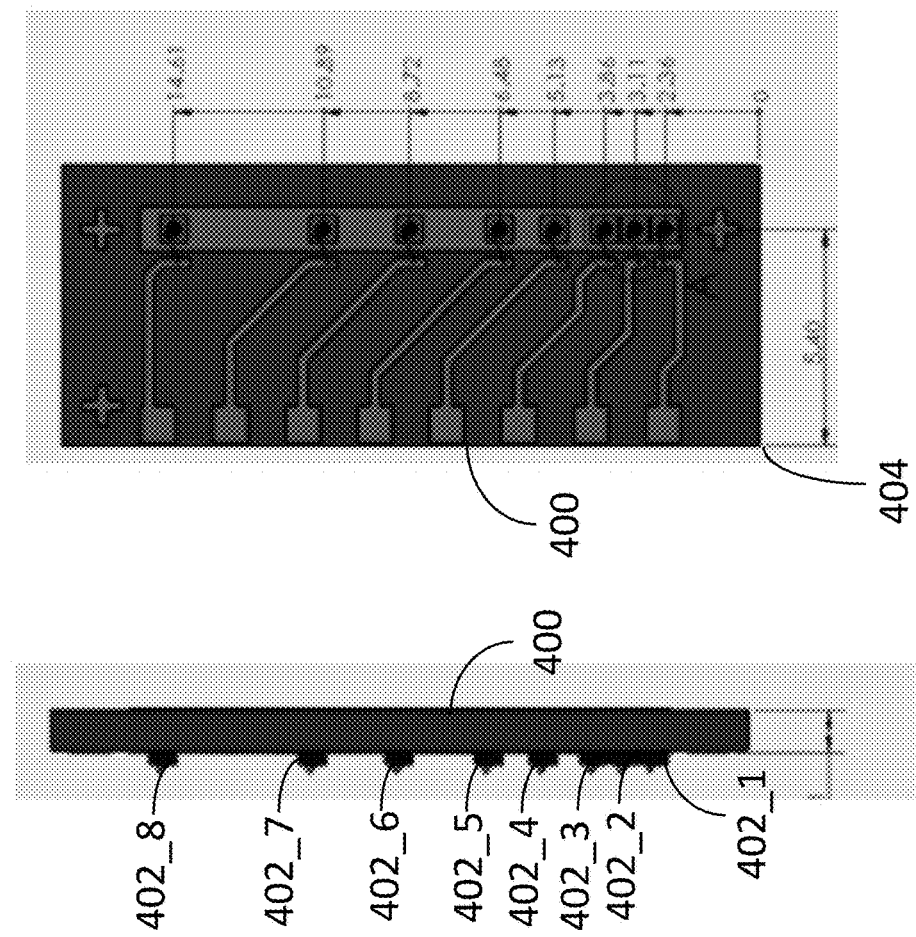
FIG. 4B
FIG. 4A

NON-UNIFORM LIDAR BEAM CONFIGURATION FOR OBJECT DETECTION, TRACKING AND CLASSIFICATION

CROSS-REFERENCE TO RELATED APPLICATION

This application claims priority to U.S. Provisional Patent Application Ser. No. 62/994,477, filed Mar. 25, 2020, the contents of which are incorporated herein by reference.

FIELD OF THE INVENTION

This invention relates generally to optical signal processing. More particularly, this invention is directed to a non-uniform lidar beam configuration for object detection, tracking and classification.

BACKGROUND OF THE INVENTION

A lidar sensor is a light detection and ranging sensor. A lidar optical remote sensing module can measure the distance to a target (e.g., a landscape in front of the module) by irradiating the target with light pulses from a laser. Time of flight is the time that it takes photons to travel to the target and return after reflection. A receiver in the lidar module processes the reflected photons.

FIG. 1A illustrates a lidar device mounted on a wall 3 m above ground. Conventionally, lidar devices have uniformly or regularly spaced emitters, which result in substantial discrepancies in beam coverage in a far field. Note in FIG. 1A that four beams impact ground within 20 m of the lidar device, while one beam impacts ground at about 25 m and another beam impacts ground at approximately 55 m. FIG. 1A also shows a horizontal line at about 1.8 m to reflect a height of many sensed objects. It can be seen that at ranges inside 15 m, many beams would hit an object of 1.8 m height, while beyond 15 m, only one beam will hit such an object most of the time. Similar spacing discrepancies exist when the lidar device is mounted at 4.5 m, as shown in FIG. 1B and 6 m, as shown in FIG. 1C.

The conventional approach to addressing these discrepancies in beam coverage is to utilize more emitters, but this introduces expense for the additional electronic parts and computational expenses to process the additional signals.

Thus, there is a need for a lidar device with improved beam coverage without a concomitant increase in device expense.

SUMMARY OF THE INVENTION

An apparatus has a collection of emitters on an emitter substrate with irregular distances between the collection of emitters to produce optical beams in a far field with a more even distribution than conventional optical beams in the far field produced by a conventional collection of emitters with regular distances between the conventional collection of emitters. A collection of receivers on a receiver substrate has irregular distances between the collection of receivers. A system substrate hosts the emitter substrate and the receiver substrate.

BRIEF DESCRIPTION OF THE FIGURES

The invention is more fully appreciated in connection with the following detailed description taken in conjunction with the accompanying drawings, in which:

FIGS. 4A, 4B and 4C illustrate a lidar receiver module utilized in accordance with embodiments of the invention.

Like reference numerals refer to corresponding parts throughout the several views of the drawings.

DETAILED DESCRIPTION OF THE INVENTION

Figure 1C:
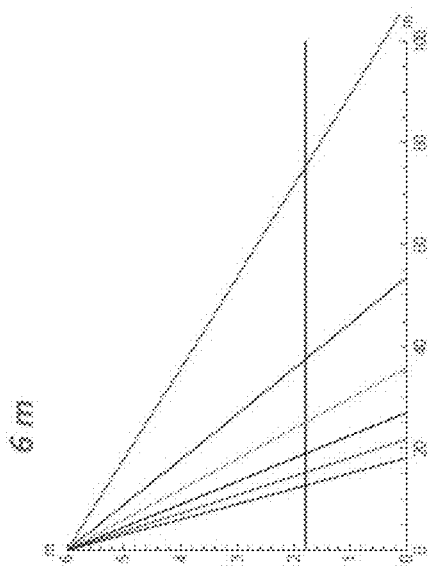
FIGS. 1A, 1B and 1C illustrate beam coverage discrepancies associated with prior art lidar devices.
Figure 1B:
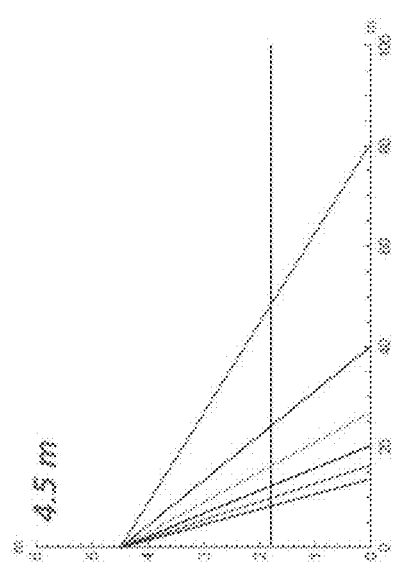
Figure 1A:
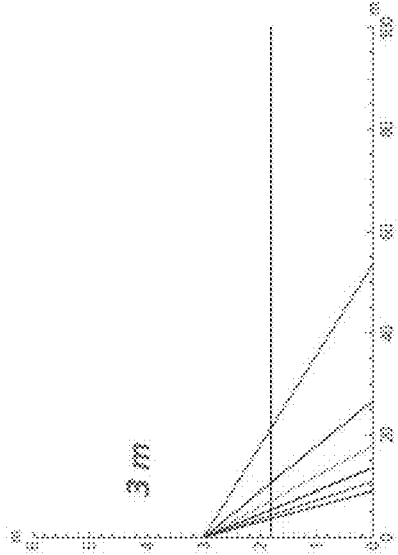
Figure 2A:
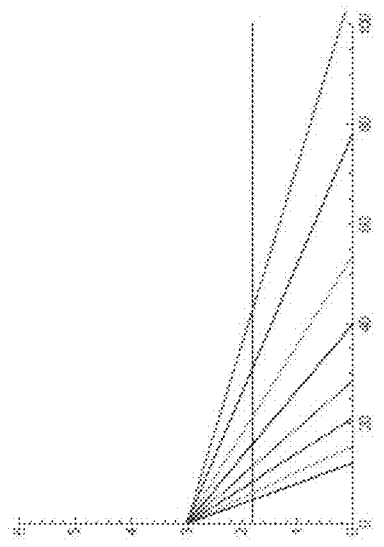
FIGS. 2A, 2B and 2C illustrate improved beam coverage associated with embodiments of the invention.

The current invention uses non-uniform or irregular physical spacing of emitters and receivers to provide a more uniform beam distribution for detection, tracking and classification. FIG. 2A illustrates a lidar device mounted at 3 m. The resultant beam patterns strike ground between approximately 15 m to over 100 m and two or more beams strike a 1.8 m target out to nearly 80 m. This is in contrast to FIG. 1A where the beam patterns struck ground between approximately 10 m and 50 m and where two or more beams strike a 1.8 m target only out to approximately 30 m and even within that range there are regions where only one beam would strike such an object. Similar improved beam spacing can be observed with a 4.5 m mounting in FIG. 2B, compared to the prior art configuration of FIG. 1B and with a 6 m mounting in FIG. 2C compared to the prior art configuration of FIG. 1C.

FIG. 2A may be associated with a smart space scenario where the lidar device is mounted at or near ceiling height of an indoor space. In a smart space scenario, occlusions are the most significant issue. Objects tracked are adults, typically between 1.4 m and 2 m in height. The tracked spaces include hallways that are 1.8 m to 10 m across. Rooms are typically 10 $m^2$ to 1,000 $m^2$. The disclosed solution leads to more consistent coverage throughout the space, thereby reducing occlusions.

Figure 2B:
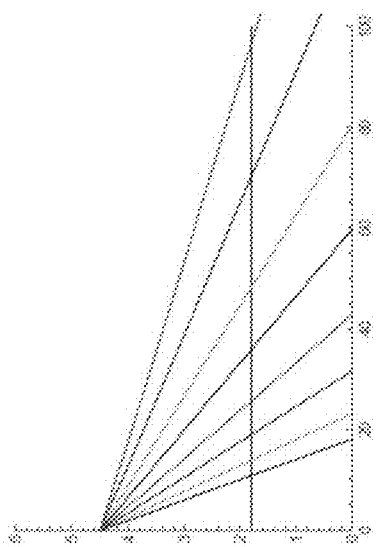

FIG. 2B may be associated with a smart city technology where the lidar device is mounted on poles at intersections or other points of interest. Such an application needs to see pedestrians and vehicles over large areas with periodic occlusions due to large vehicles. Individuals are typically between 1.4 m and 2 m in height. Personal vehicles are 2.7 m×1.9 m×1.2 m to 6.4 m×2.0 m×2.0 m. Two wheelers are 1.0 m×0.5 m×1.2 m to 2.6 m×1.2 m×1.6 m. Commercial vehicles are approximately 2.6 m×1.2 m×1.6 m to 20 m×2.5 m×44.3 m. The disclosed solution provides more consistent coverage for classification of objects over the relatively large space.

Figure 2C:
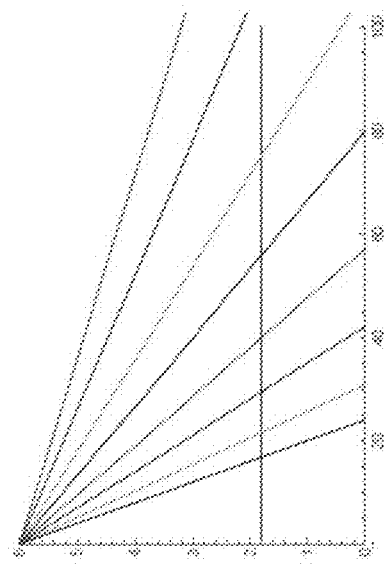

FIG. 2C may be associated with a perimeter security application. The lidar device is mounted on poles, fences or walls. There needs to be sufficient coverage to recognize people and vehicles and distinguish them from vegetation and animals. The disclosed solution provides more consistent coverage over long ranges.

Figure 3C:
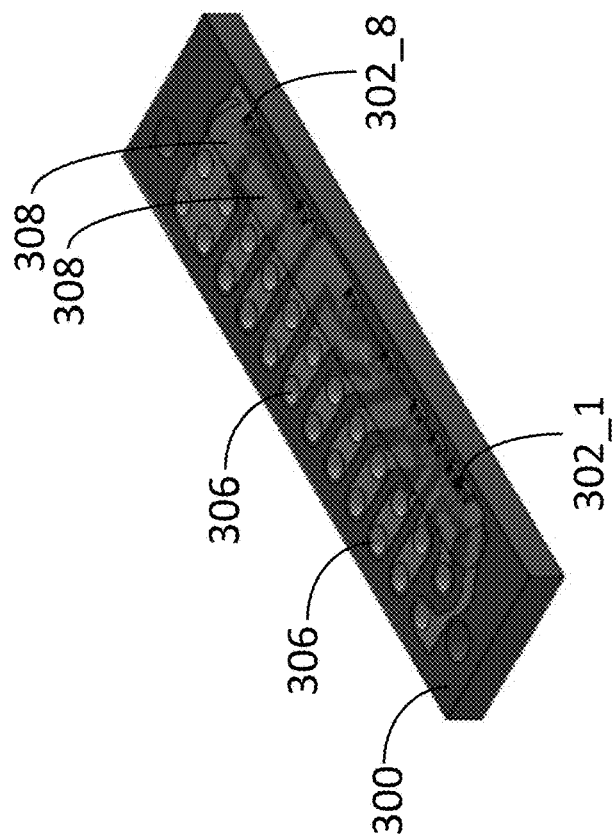
FIGS. 3A, 3B and 3C illustrate a lidar emitter module utilized in accordance with embodiments of the invention.
Figure 3B:
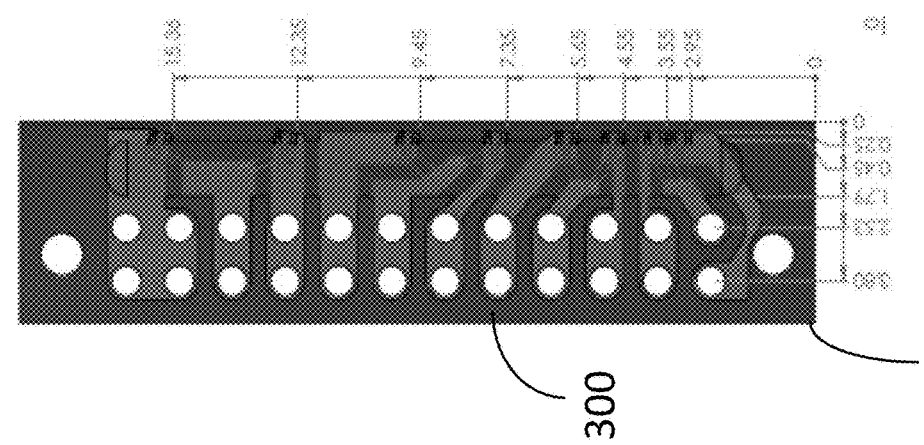
Figure 3A:
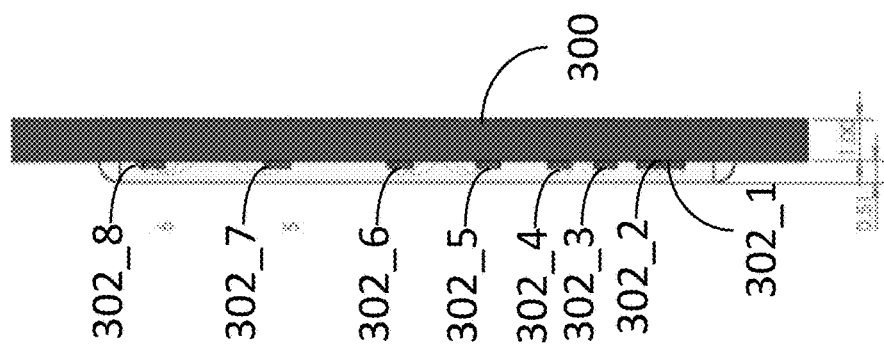

FIG. 3A is a side view of an substrate (e.g., emitter printed circuit board) 300 with eight emitters 302_1 through 302_8 at irregularly spaced intervals along the vertical axis. FIG. 3B illustrates a top view of the same substrate 300. The emitters are shown at vertical positions measured in mm from the bottom 304 of the substrate 300. In this example, the first emitter is 2.95 mm from the bottom 304. The next emitter is at 3.55 mm, followed by emitters at 4.55 mm, 5.65 mm, 7.35 mm, 9.45 mm, 12.35 mm and 15.36 mm. Consequently, the spacing between emitters is respectively 0.6 mm, 1 mm, 1.1 mm, 1.7 mm, 2.1 mm, 2.9 mm and 3.01 mm. With a total vertical distance of 15.36 mm, the spacing between emitters therefore ranges from approximately 4% (0.6/15.36) to approximately 20% (3.01/15.36) of the total vertical distance.

FIG. 3C is a perspective view of the emitter substrate 300. The figure illustrates contact pads 306 and traces 308 to emitters 302_1 through 302_8. Bond wires (not shown) link traces 308 to emitters 302_1 through 302_8.

FIG. 4A is a side view of a receiver substrate (e.g., printed circuit board) 400 with eight receivers or diodes 402_1 through 402_8 at irregularly spaced intervals along the vertical axis. FIG. 4B illustrates a top view of the same receiver substrate 400. The receivers are shown at vertical positions measured in mm from the bottom 404 of the substrate 400. In this example, the first receiver is 2.36 mm from the bottom 404. The next receiver is at 3.11 mm, followed by receivers at 3.86 mm, 5.13 mm, 6.48 mm, 8.72 mm, 10.89 mm and 14.61 mm. Consequently, the spacing between receivers is respectively 0.75 mm, 0.75 mm, 1.27 mm, 1.35 mm, 2.24 mm, 2.17 mm, and 3.72 mm. With a total vertical distance of 14.61 mm, the spacing between receivers therefore ranges from approximately 5% (0.75/14.61) to approximately 25% (3.72/14.61) of the total vertical distance.

FIG. 4C is a perspective view of the receiver substrate 400. The figure illustrates contact pads 406 and traces 408 to receivers 402_1 through 402_8. Bond wires (not shown) link traces 408 to receivers 402_1 through 402_8.

In addition to the irregular physical spacing of the emitters and receivers, beam steering optical elements, such as lenses and mirrors may be used to produce more uniform beam distributions in far fields.

Figure 5:
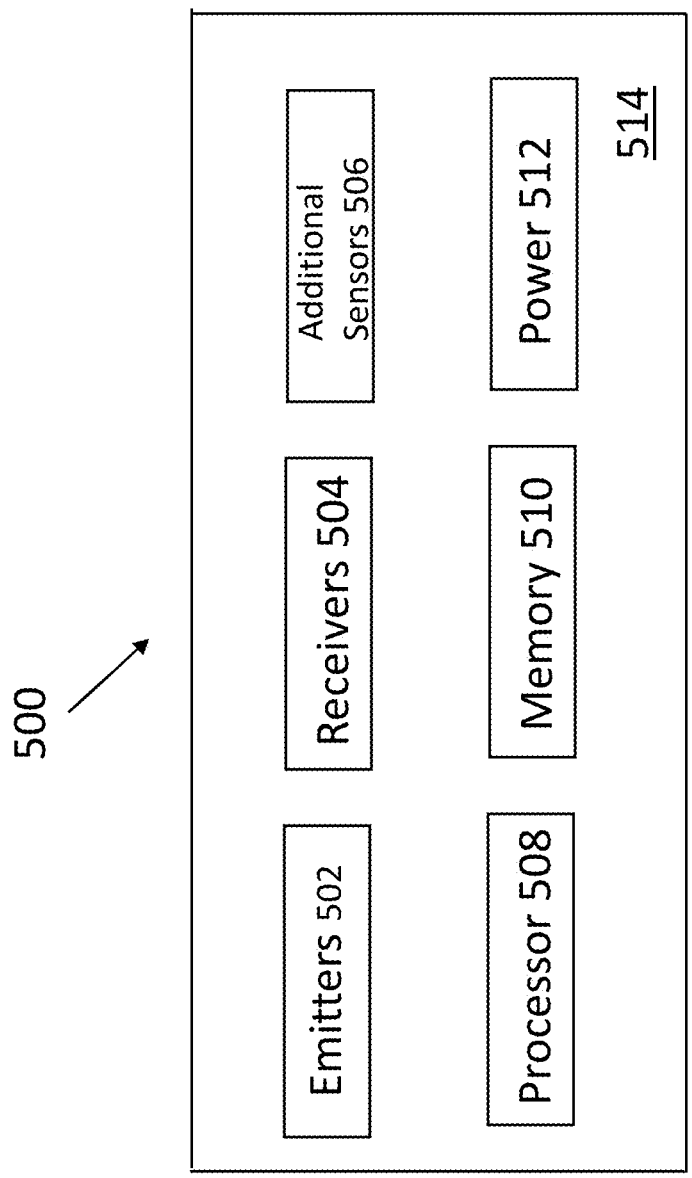
FIG. 5 illustrates a system incorporating the disclosed emitter module and receiver module.

Any system incorporating the disclosed emitters and receivers also operate with any number of complementary sensors, data processing modules, communication modules, storage modules and power supply. Mechanical components are configured to protect, connect and mount the system components. For example, FIG. 5 illustrates a system 500 with the disclosed emitters 502, receivers 504, additional sensors 506, a processor 508, memory 510, and power electronics 512 mounted on a system substrate (e.g., printed circuit board) 514.

The invention can be used in connection with Time of Flight (ToF) lidar sensors for real-time three-dimensional mapping and object detection, tracking, identification and/or classification. The reflected pulses (or modulated signals) are detected with the time of flight and the intensity of the pulses (or modulated signals) being measures of the distance and the reflectivity of the sensed object, respectively. Thus, the two-dimensional configuration of optical emitters provides two degrees of information (e.g., x-axis and y-axis), while the time of flight data provides a third degree of information (e.g., z-axis or depth).

Figure 6:
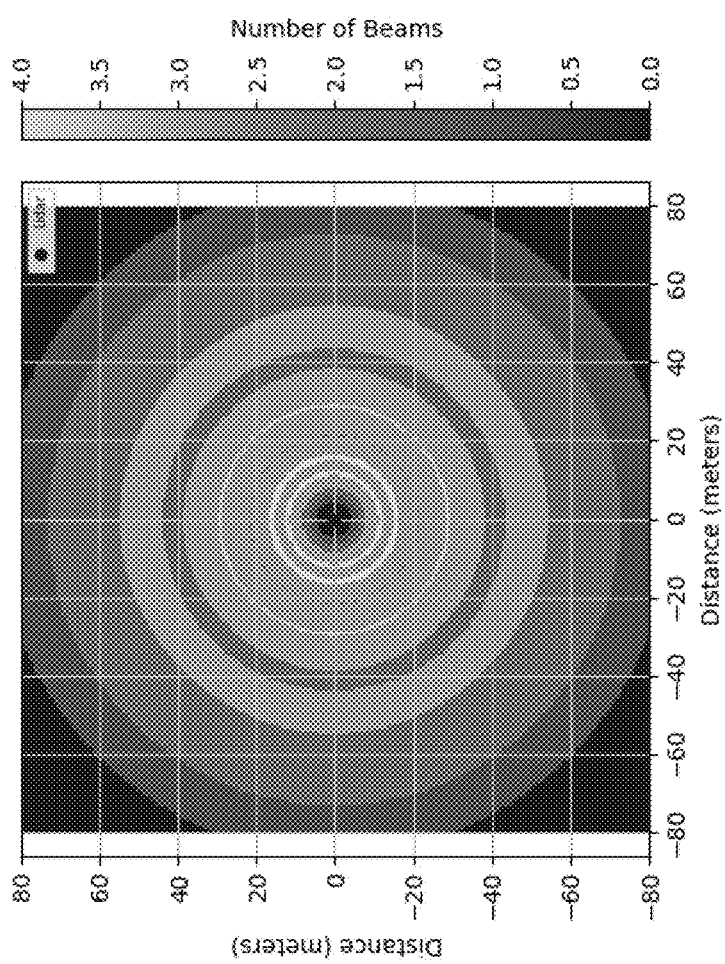
FIG. 6 illustrates beam coverage associated with embodiments of the invention.

FIG. 6 illustrates beam coverage for an embodiment of the invention with eight emitters mounted at 3 m. It shows the number of beams that would strike an object 1.8 meters tall. The figure shows relatively uniform coverage compared to prior art approaches.

Figure 7:
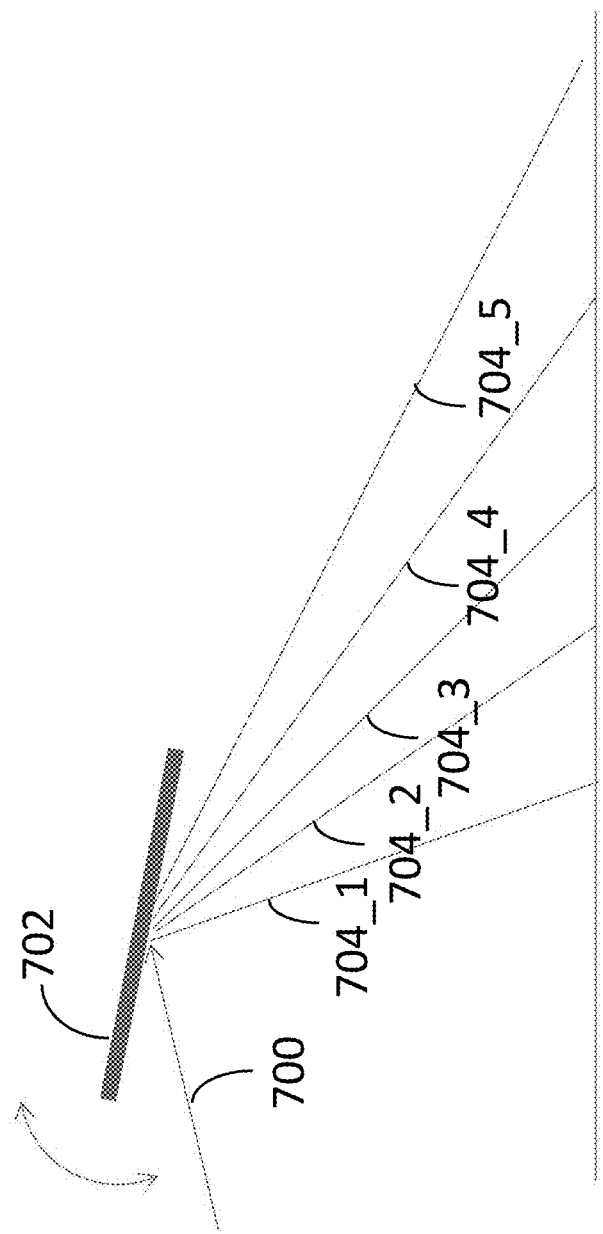
FIG. 7 illustrates a beam steering technique to achieve improved far field beam coverage.

FIG. 7 illustrates an alternate embodiment of the invention that produces substantially uniform beam distributions in far fields through beam steering. An ingress laser beam 700 is directed to a scanning mirror 702 with a rotation or oscillation rate at different angles to produce reflected beams 704_1 through 704_5 at desired locations in a far field. Alternately, the mirror 702 can have a constant rotation and oscillation and the ingress laser beam 700 has modulated laser firing to place beams at desired locations in the far field. The receiver side can have a collection of discrete receivers on a receiver substrate with irregular distances between the collection of receives for specific angles. Alternately, a continuous linear detector array can be used to cover the reflected laser signal from all angles. An optical phased array can also be configured to produce substantially uniform beams in a far field. In such an embodiment, the receivers may have the receiver configurations disclosed herein.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   a collection of emitters on a planar surface of an emitter substrate with irregular distances between the collection of emitters to produce optical beams in a far field with a more even distribution than conventional optical beams in the far field produced by a conventional collection of emitters with regular distances between the conventional collection of emitters;
   a collection of receivers on a planar surface of a receiver substrate with irregular distances between the collection of receivers; and
   a system substrate hosting the emitter substrate and the receiver substrate;
   wherein the emitters are colinear and the receivers are colinear;
   wherein the irregular distance between at least a first pair of adjacent ones of the emitters is greater than 17% of a total vertical distance from a bottom of the emitter substrate to a distal emitter of the collection of emitters; and
   wherein the irregular distance between at least a first pair of adjacent ones of the receivers is greater than 17% of the total vertical distance from the bottom of the receiver substrate to the distal receiver of the collection of receivers.

2. The apparatus of claim 1, wherein the irregular distances between the collection of emitters range between approximately 4% and 20% of the total vertical distance from the bottom of the emitter substrate to the distal emitter of the collection of emitters.

3. The apparatus of claim 1, wherein the irregular distances between the collection of receivers on the receiver substrate range between approximately 5% and 25% of the total vertical distance from the bottom of the receiver substrate to the distal receiver of the collection of receivers.

4. The apparatus of claim 1, further comprising additional sensors on the system substrate.

5. The apparatus of claim 1, further comprising a processor on the system substrate.

6. The apparatus of claim 1, further comprising memory on the system substrate.

7. The apparatus of claim 1, further comprising power electronics on the system substrate.

8. The apparatus of claim 1, further comprising beam steering optical elements.

9. The apparatus of claim 1, further comprising emitter and receiver positions with different percentages of a ratio of a vertical distance to a lens focal length.

10. The apparatus of claim 1, further comprising emitter and receiver pairs using identical vertical distance ratios.

* * * * *